US005829309A

United States Patent [19]
Wagner et al.

[11] Patent Number: 5,829,309
[45] Date of Patent: Nov. 3, 1998

[54] MOTOR VEHICLE WITH AUTOMATIC CHANGE-SPEED GEARBOX AND MECHANICAL FOR REVERSE GEAR

[75] Inventors: Bernd Wagner, Kernen; Christoph Wefers, Esslingen, both of Germany

[73] Assignee: Mercedes-Benz AG, Germany

[21] Appl. No.: 891,872

[22] Filed: Jul. 9, 1997

Related U.S. Application Data

[63] Continuation of Ser. No. 398,587, Mar. 1, 1995, abandoned.

[30] Foreign Application Priority Data

Mar. 1, 1994 [DE] Germany ............... 44 06 598.1

[51] Int. Cl.[6] ............ F16H 61/18; B60K 20/00
[52] U.S. Cl. .................. 74/473.22; 74/473.21; 74/473.1
[58] Field of Search ............... 74/476, 473 R, 74/475, 473.22, 473.21, 473.1

[56] References Cited

U.S. PATENT DOCUMENTS 4,022,078  5/1977  Malott .......................... 74/476
5,078,020  1/1992  Hasegawa .
5,255,570  10/1993  Shirahama et al. ............ 74/475
5,388,477  2/1995  Frei et al. ..................... 74/476
5,435,424  7/1995  Murakami et al. ............. 74/475
5,465,818  11/1995  Osborn et al. ................. 74/475

FOREIGN PATENT DOCUMENTS

| 0 324 469 A2 | 7/1989 | European Pat. Off. . |
| 2 297 743 | 8/1976 | France . |
| 32 14 710 C3 | 3/1983 | Germany . |
| 34 44 761 A1 | 2/1989 | Germany . |
| 41 18 519 A1 | 2/1993 | Germany . |
| 63-189774 | 12/1988 | Japan . |
| 64-33433 | 3/1989 | Japan . |
| 3-239868 | 10/1991 | Japan . |
| WO 92/21899 | 10/1992 | WIPO . |

*Primary Examiner*—Charles A. Marmor
*Assistant Examiner*—David M. Fenstermacher
*Attorney, Agent, or Firm*—Evenson, McKeown, Edwards & Lenahan, P.L.L.C.

[57] ABSTRACT

A motor vehicle automatic gear-change device in a change-speed gearbox is connected to a manual selector lever which is arranged in the region of the driver's seat. A mechanical interlock, which can be actuated by an electromagnet, can be caused to act on the selector lever to prevent changing into the reverse gear.

38 Claims, 12 Drawing Sheets

FIG. 9

| Speed | Gear-change lever-position | Interlock active | inactive |
|---|---|---|---|
| v > 8 km/h | D |  | x |
| v > 8 km/h | leave D | x |  |
| v > 8 km/h | 4 |  | x |
| v > 8 km/h | reach N | x |  |
| v > 8 km/h | N stationary | x |  |
| v < 8 km/h | D |  | x |
| v < 8 km/h | leave D |  | x |
| v < 8 km/h | 4 |  | x |
| v < 8 km/h | reach N |  | x |
| v < 8 km/h | N stationary |  | x |
| v < 8 km/h | R |  | x |
| v < 8 km/h | P |  | x |

MOTOR VEHICLE WITH AUTOMATIC CHANGE-SPEED GEARBOX AND MECHANICAL FOR REVERSE GEAR

This application is a continuation of application Ser. No. 08/398,587 filed on Mar. 1, 1995 now abandoned.

BACKGROUND AND SUMMARY OF THE INVENTION

The present invention relates to a motor vehicle, and more particularly, to a gear-change device for a change-speed gearbox in a motor vehicle, comprising a manual selector lever arranged at a driver's seat region and actuatable from an N-position for interrupting torque transmission in a change-speed gearbox into one of a D-position for activating a gear-change program for forward driving and an R-position for changing to a reverse gear, a mechanical interlock actuatable by an electromagnet to prevent changing into the reverse gear, and at least one switch actuatable in dependence on setting of the change-speed gearbox to control the electromagnet which is connected to the interlock by an interlock lever pivotably mounted on a motor vehicle fixed part.

In the known motor vehicle shown in DE 3,214,710 C3 and having a change-speed gearbox which has a mechanical gear-change device actuated by hand, a so-called locking magnet has an armature which is directly connected to an interlock lever which is mounted on the outside on the outer wall of the housing of the change-speed gearbox and, in turn, actuates the interlock which is arranged inside the change-speed gearbox, operates on the gear-change device and is controlled via the locking magnet by an electronic control unit. Changing back into the reverse gear is blocked when the manual gear-change lever is moved in the direction towards the new gear and the driving speed in the forward driving direction is still too high. For this purpose, a control signal, which depends on the driving speed, and a control signal, which is produced by the switch for the reversing lights and in this way is derived from the actuation of the gear-change lever, are linked in a logic switching stage of the control unit so that the blocking is only effective if the control signal dependent on the driving speed is present before the control signal derived from the actuation of the gear-change lever. Although the use of such an interlock for reverse gear is also suggested in an automatic gearbox in this German patent document, no description is given as to how this can be done.

A gear-change device is also shown in JP-A 3-239868. However, the interlock lever which can be actuated by the electromagnet acts on a second interlock device which fixes the manual selector lever in its significant selector-lever positions relative to a catch plate fixed to the vehicle in a manner which is actually non-displaceable. The lever has to be hand disengaged by a push button accommodated in the handle of the manual selector lever for actuating the selector lever in each case into one of the other significant selector-lever positions.

A gear-change device is further described DE 3,744,761A1. The electromagnet is not connected to the interlock by an interlock lever which is mounted pivotably on a part fixed to the vehicle. In this known gear-change device, a second interlock device fixes the hand lever in its significant selector-lever positions relative to a catch plate fixed to the vehicle in a manner which is actually non-displaceable and has to be disengaged, for actuating the manual selector lever of telescopic two-part configuration in each case into one of its other significant selector-lever positions. This is accomplished by depressing the telescopic part which has the handle and an interlock pin engaging in the catch plate relative to the other telescopic part which is mounted pivotably on a bearing block and is connected by a linkage to the gear-change device of the change-speed gearbox. A threaded bush is molded onto the pivotably mounted telescopic part, and the electromagnet can be screwed on the bush. A locking pin is molded onto its armature part and, when the interlock is activated, engages in a corresponding transverse bore of the telescopic part having the handle and the locking pin of the second interlock device. A switch which operates as a function of the P-position and the N-position of the manual selector lever can be provided either directly on the automatic gearbox or on the telescopic arrangement.

The two last-mentioned known gear-change devices require two interlock devices to prevent changing into the reverse gear during forward driving. In these gear-change devices, therefore, the constructional expenditures and susceptibility to malfunction are unacceptably high.

An object of the present invention is to provide, in a motor vehicle having an automatic change-speed gearbox in which the gear-change device is controlled by an electronic control unit and has manually selectable positions R for the reverse gear and P for setting a mechanical interlock for parking, a gear-change device for essentially preventing the impermissible selection of the R position or the unintentional reaching of the P position from a forward driving position by an interlock which is activated at a speed above a given threshold value. The interlock is independent of the type and the spatial arrangement of the change-speed gearbox and is distinguished by advantageously compact dimensions and low weight.

The foregoing object has been achieved according to the present invention in an advantageous manner by providing that the interlock and the change-speed gearbox with an associated gear-change device are spatially separated. An interlock nose associated with the gear-change device is provided on a setting shaft connected to the gear-change device via a setting linkage. The setting shaft and the interlock lever are mounted on an instrument carrier arranged in the driver's seat region and to which the electromagnet is also fastened. The manual selector lever is connected kinematically to the setting shaft, and a switching arm for actuating the switch in dependence on the setting is arranged securely against rotation relative to the setting shaft and together with corresponding switching contacts of the switch within the instrument carrier.

In the motor vehicle according to the present invention, the mechanical parts of the interlock, the electromagnet, the switching contacts for the control signal derived from the actuation of the selector lever and those parts of the selector device into which the manual forces are introduced during selection are all assembled on a small, handy instrument carrier which is arranged on a gearbox tunnel, in a dashboard or at a different place in the passenger compartment in the region of the driver's seat and can thus be used in different vehicle types, and with different engine types and arrangements.

In the motor vehicle according to the present invention, those parts of the selector device into which the manual forces are introduced during selection are not only blocked directly by the mechanical parts of the interlock, but also directly actuate the switch for the relevant control signal. That is, the functions of blocking and forming control signals are combined at a single location, namely that of introducing the manual force into the selector linkage, so that installation and other tolerances, as well as incorrect operation of the selector device, cannot lead to the interlock being overridden.

In the motor vehicle according to the present invention, a preassembled construction is made possible by the instrument carrier. An adjustment of the interlock lever and electromagnet in relation to their position relative to the axis of rotation of the setting shaft is achieved by the instrument carrier having an end shield arranged pivotably in relation to an axis of rotation of the setting shaft. The electromagnet and a bearing of the interlock lever are arranged on the end shield fixed relative to the instrument carrier.

The high forces which result on the mechanical parts of the interlock from an impermissible actuation of the manual selector lever in the direction of the R-position and which have to be absorbed by the instrument carrier are reduced in an advantageous manner by, inter alia, supporting the end shield on a supporting bearing of the instrument carrier. The supporting bearing has a distance from the axis of rotation of the setting shaft greater than a distance of the interlock part arranged on the setting shaft from the axis of rotation so that the instrument carrier itself can be plastic and the end shield is sheet metal.

By the vertical arrangement of the electromagnet in the motor vehicle according to the present invention in relation to the axis of armature motion, apart from the accelerations occurring in the directions of the vertical axis, essentially all the transverse, longitudinal and yaw acceleration forces are prevented from influencing the electromagnet.

The assignment of the release position of the interlock to the non-excited rest position of the electromagnet, in particular in conjunction with the vertical arrangement of the latter, advantageously simplifies the fixing of the end position of the interlock and the configuration of the articulated connection between the magnet armature and the interlock lever.

Advantageous mechanical features of the interlock include the interlock lever having a nose which cooperates with a corresponding nose on the setting shaft which is rotationally secured to a cam disc. By virtue of assigning the interlock nose in the setting shaft to the angular setting corresponding to the N-position, it is further ensured that the interlock will already be effective when the N-position is reached, thus reliably avoiding changing to the reverse gear.

An arrangement in which, when a momentary angular setting of the setting shaft lies within an angular range adjoining an angular setting of the setting shaft corresponding to the D-position and contains an angular setting corresponding to the R-position, the switch is moved into a position to produce a control signal for an interlock position of the electromagnet ensures the actuation of the switch for the control signal, which is dependent on switching, in the relevant angular range of the setting shaft.

A particular advantageous aspect of the present invention is that the interlock, but in particular the electromagnet and the attached interlock lever, is lightweight and of compact construction. In order to suppress oscillation and noise phenomena, caused by the vibration of the vehicle body, on the kinematic chain, magnet armature—interlock lever, an embodiment of the present invention utilizes a catch which can be pushed over counter to spring force is provided for the release position of the interlock.

Because, in the targeted use of a small, lightweight electromagnet, only weak setting forces are also expected, problems might result in matching in relation to the resilient bias of the catch used for the release position. In order to avoid these possible difficulties from the outset, a positive control is to be considered advantageous for the catch. For example, a cam control is operatively arranged between the setting shaft and a catch for a release position of the interlock lever such that the catch is moved into a free travel position, in which an engagement thereof relative to a corresponding catch part is cancelled, when a momentary angular setting of the setting shaft is within an angular range containing an angular setting corresponding to the N-position and extends up to an angular setting corresponding to the R-position.

In this latter-mentioned exemplary embodiment, an integral configuration of the interlock nose and control cam on the setting shaft is achieved by providing that the interlock nose on the setting shaft and a cam section of the cam control of the catch lie in a common plane of the instrument carrier perpendicular to the axis of rotation of the setting shaft. The cam section is formed by a surface lying in a plane parallel to the axis of rotation of the setting shaft, points of which planar surface located nearer to an adjoining cam section have a distance from the axis of rotation greater than a distance of points located further away from the adjoining cam section from the axis of rotation. Also, the interlock nose on the setting shaft and the cam sections of the cam control for the catch are integral.

It is advantageous to arrange the catch part, belonging to the interlock lever, of the catch used for the release position on the lever arm of the interlock lever having the interlock nose.

The catch, used for the release position, can actually be arranged on the instrument carrier itself. In one particularly advantageous embodiment, however, the catch is arranged on a lever arm of a catch lever arranged pivotally on the end shield. Furthermore, a helical tension spring is anchored at one end thereof on a second lever arm of the catch lever and is anchored at another end on the end shield, and pivot axes of the interlock lever and of the catch lever are parallel to the axis of rotation of the setting shaft.

In order reliably to avoid overriding of the interlock due to an arbitrary or incorrect, rapid back-and-forth actuation of the selector lever, a catch can also be provided for the interlock position of the interlock lever. This catch is arranged to be pushed over counter to the effect of a resilient bias and is engageable with a corresponding catch part on a link of a kinematic chain, interlock lever—magnet armature.

Since as previously noted, in the targeted use of an electromagnet of compact and lightweight construction, only weak restoring forces are to be anticipated for actuating the kinematic chain, magnet armature—interlock lever, into the release position, difficulties may result in matching in relation to the resilient apparatus which has to be pushed over to overcome the catch. In order to avoid these such difficulties from the outset, a positive control can be provided for the catch used for the interlock position. In particular, a cam control is provided between the setting shaft and the catch used for the interlock position so that the catch is moved into a free travel position in which engagement thereof relative to a corresponding catch part is cancelled when a momentary angular setting of the setting shaft reaches a firs angular setting corresponding to the N-position. Furthermore, the cam control for the catch, used for the interlock position, has a cam section assigned to an angular range which is located between the first angular setting corresponding to the N-position and a second angular setting corresponding to the D-position. The catch is actuatable by the cam section between the free travel position and an engagement position in which the catch, used for the interlock position, is engageable with the corresponding catch part, with the interlock lever being disposed in the interlock position.

In order to avoid the possibility of the interlock lever being moved into an unstable position in relation to its interlock position by way of the spring force of the catch used for the interlock position, in particular if the selector lever is actuated again in the direction of the N-position before reaching the D-position, a configuration is provided in which the catch part, belonging to the catch used for the interlock position, has a section having a course relative to the pivot axis of the interlock lever such that a torque results from engagement with the associated catch on the interlock lever. An active direction of the torque corresponds to a direction of rotation directed from the interlock position to the release position of the interlock lever. Also, the catch part, belonging to the catch used for the interlock position, has a receiver adjoining the section for the torque acting in the release direction, for the engagement position of the catch. The receiver is located offset relative to the section in the direction of rotation, pointing from the release position to the interlock position, relative to the pivot axis of the interlock lever.

The interlock nose on the setting shaft and the cam sections of the cam control for the catch used for the interlock position can be integral. That is, the interlock nose on the setting shaft and a cam section for actuating the catch used for the interlock position lie in a common plane perpendicular to the axis of rotation of the setting shaft between the free travel position and an engagement position. The cam section is formed by a surface lying in a plane parallel to the axis of rotation of the setting shaft. Points of the planar surface located nearer to the adjoining cam section for fixing the catch in the free travel position have a distance from the axis of rotation greater than points of the planar surface located further away from the cam section for fixing the catch in the free travel position from the axis of rotation.

The position of the catch part of the catch used for the interlock position can be provided on the interlock lever.

One contemplated embodiment of catch lever for the catch used for the interlock position includes arranging the catch on a lever arm of a catch lever arranged pivotably on the end shield. A helical tension spring is anchored at one end thereof on a second lever arm of the catch lever having the catch used for the interlock position, and is anchored at the other end thereof on the end shield. The pivot axis of the catch lever, having the catch used for the interlock position, is parallel to the axis of rotation of the setting shaft.

A direct cam engagement between the setting shaft and the catch used for the interlock position is provided. It has proved to be advantageous to use a common control cam on the setting shaft for the cam controls of the two catches for the release position and for the interlock position of the interlock lever. Furthermore, it is also advantageous to configure the two catches for the release position and for the interlock position of the interlock lever not on separate catch levers, but on a common catch lever.

BRIEF DESCRIPTION OF THE DRAWINGS

These and other objects, features and advantages of the present invention will become more readily apparent from the following detailed description thereof when taken in conjunction with the accompanying drawings wherein:

FIG. 8 is an enlarged portion of FIG. 1a; and

FIG. 9 is a table shown the state of the interlock of FIG. 1, depending on the driving speed, in individual positions of the selector lever.

DETAILED DESCRIPTION OF THE DRAWINGS

Figure 1:
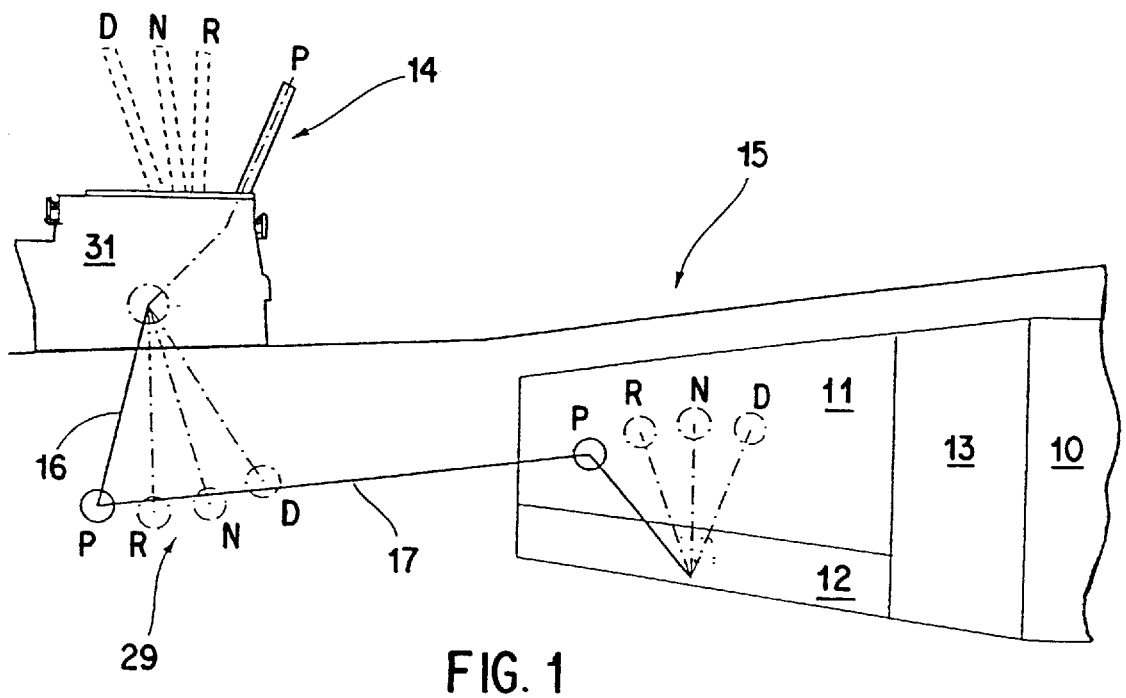
FIG. 1 is a schematic view of a relevant portion of a motor vehicle gearbox tunnel according to the present invention.
Figure 1A:
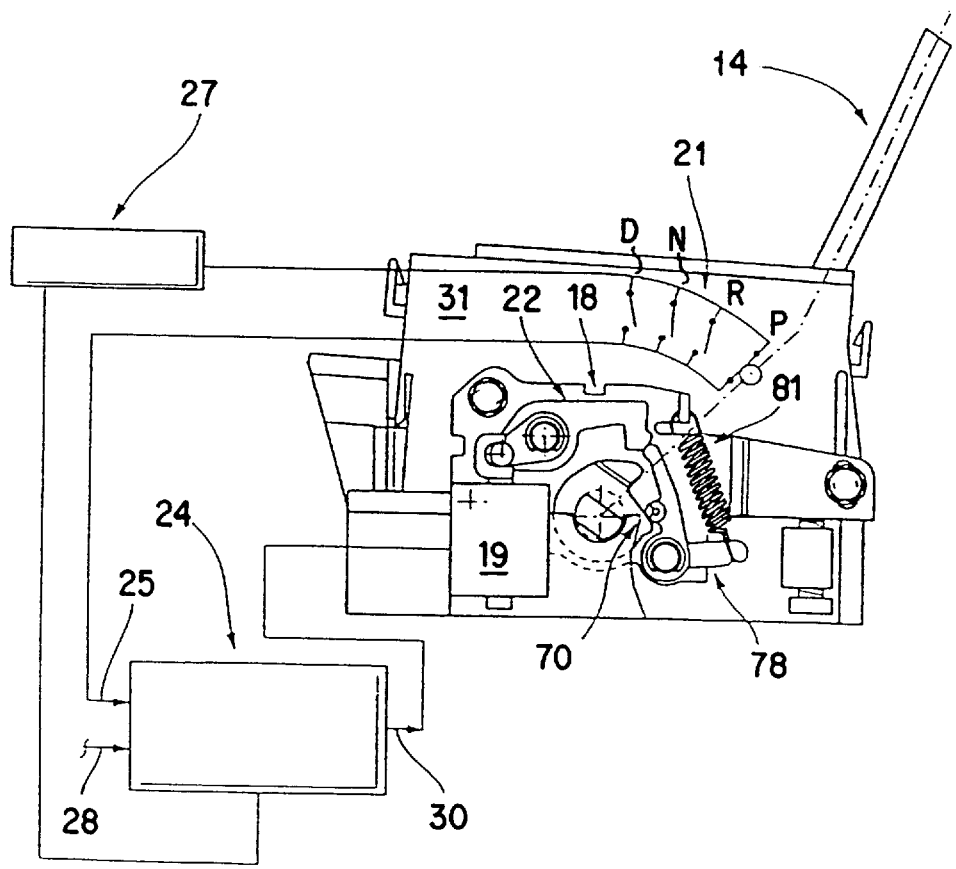
FIG. 1a is a control block circuit diagram for the interlock used in the arrangement of FIG. 1.
Figure 1B:
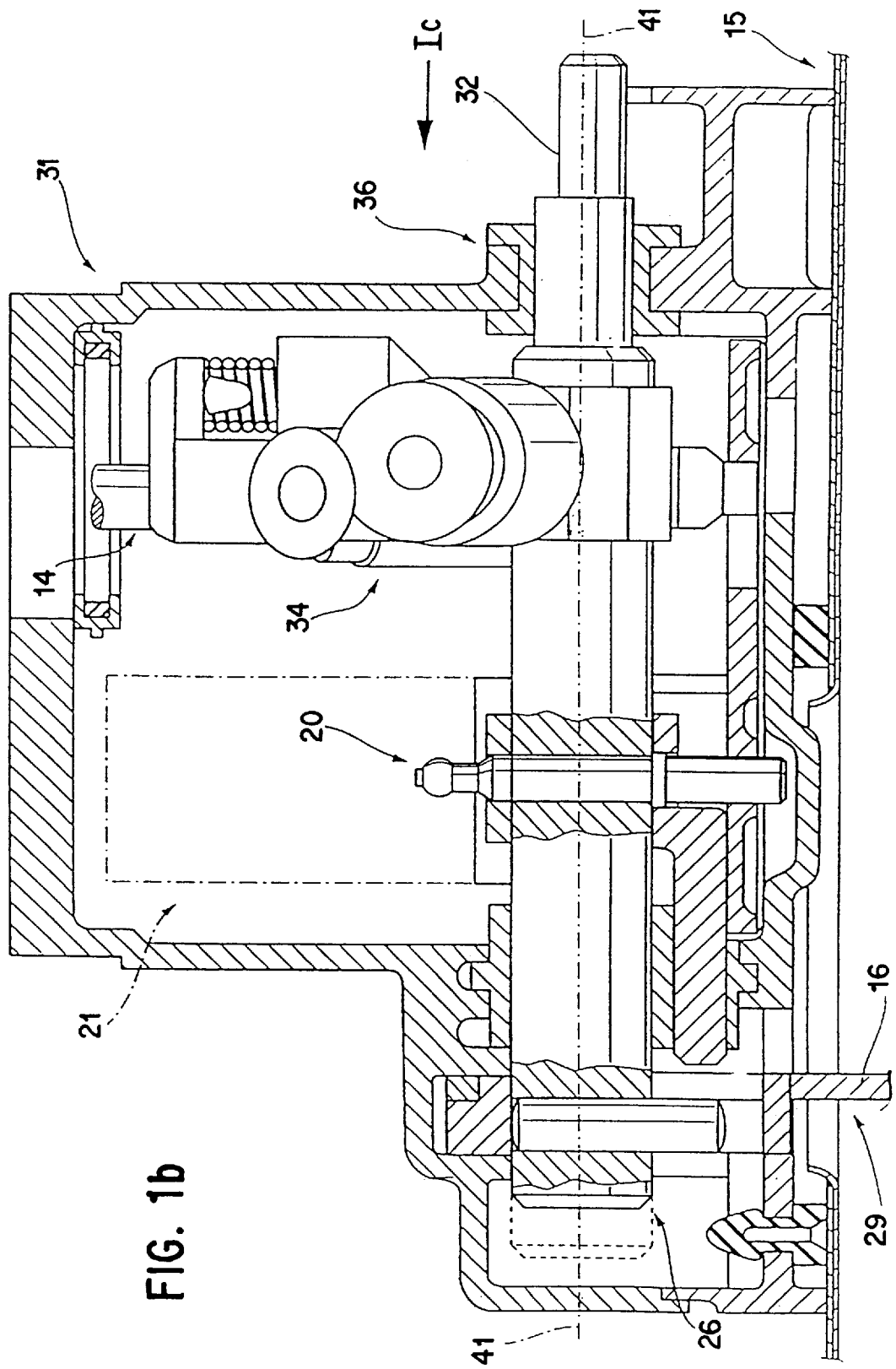
FIG. 1b is a cross-sectional view through the instrument carrier used in the arrangement of FIG. 1.

Referring to FIGS. 1 and 1a to 1d, an instrument carrier 31 is fastened in a stationary manner laterally next to the driver's seat on the gearbox tunnel 15 of a motor vehicle which is driven by a drive motor 10 via a change-speed gearbox 11, possibly with interposition of a conventional hydrodynamic flow unit 13. A setting shaft 26 (FIG. 1b) is mounted in the instrument carrier 31 so as to be rotatable and, to a limited degree, also axially displaceable.

A setting lever 16 is connected fixedly to the one end of the setting shaft 26 arranged with its axis of rotation 41—41 transversely to the longitudinal direction of the vehicle. A linkage part 17 of a setting linkage designated generally by the numeral 29 is attached to the setting lever 16 and leads, in terms of effect, to an automatic gear-change device 12 of the change-speed gearbox 11. A carrier pin 20 (FIG. 1b) is arranged fixedly in the axially central region of and relative to the setting shaft 26 and actuates a switching element 21, which connected to an electronic control unit 24 (FIG. 1a), to produce a control signal which is derived from the actuation of a selector lever 14 and can be switched to an input 25 of the control unit 24 connected to a current supply 27.

At a second input 28 of the control unit 24 whose output 30 is supplied to an electromagnet 19 for actuating a mechanical interlock 18 (FIGS. 1a, 1c and 2 to 8), to prevent an impermissible change to the reverse gear, an input signal is present whenever the driving speed is higher than a threshold value of, for example, 8 km/h.

Figure 1C:
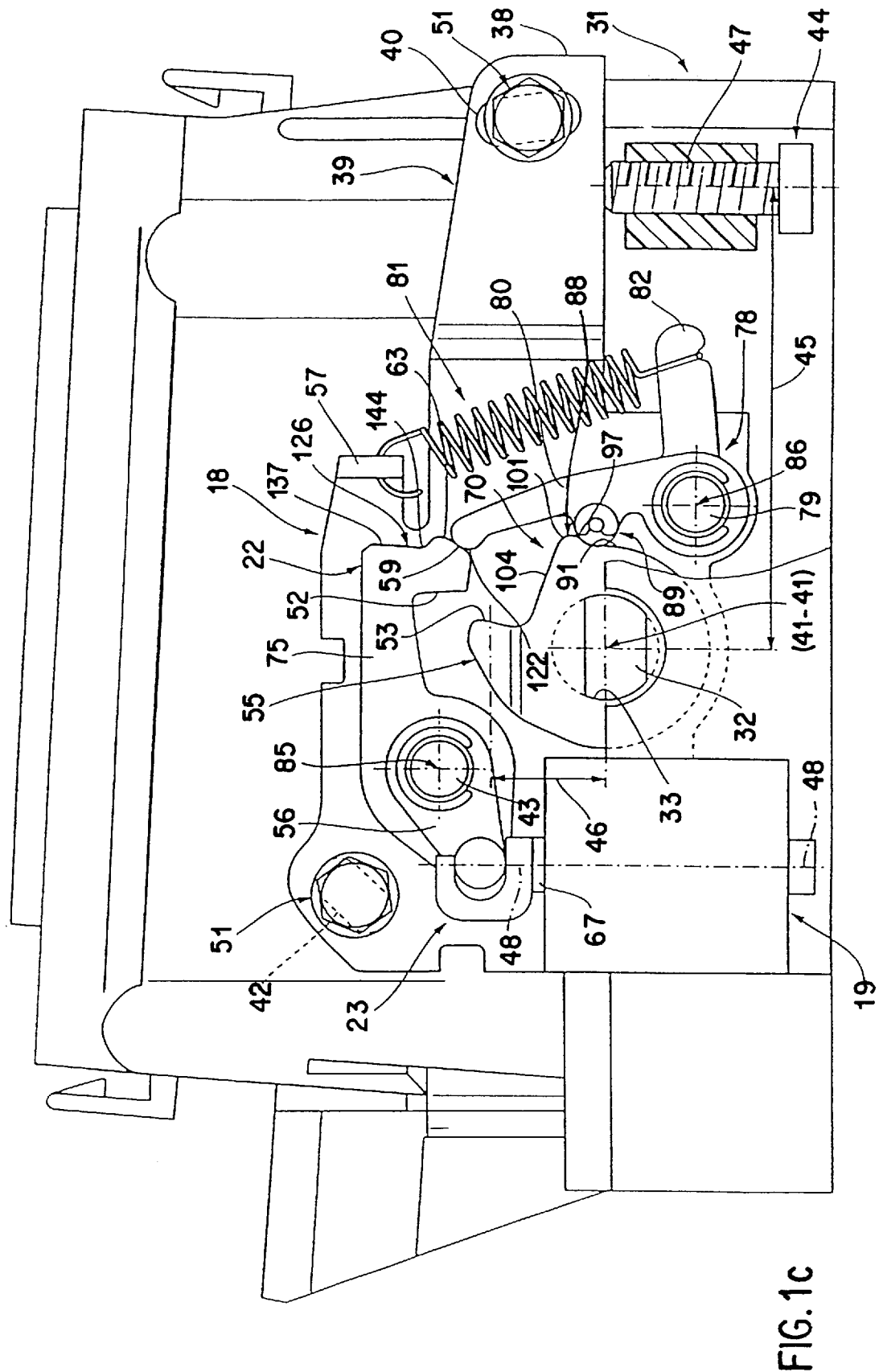
FIG. 1c is a lateral view of the instrument carrier, used in the arrangement of FIG. 1, as seen in the direction of the arrow Ic of FIG. 1b.
Figure 1D:
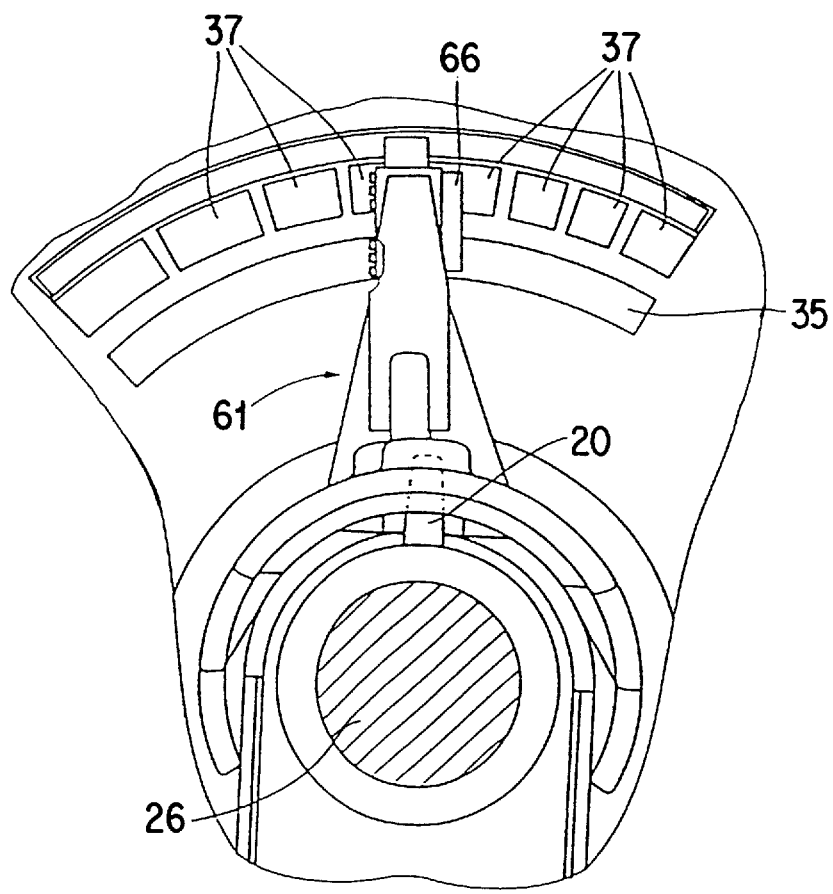
FIG. 1d is a partial longitudinal sectional view through an electrical switching element of the instrument carrier used in the arrangement of FIG. 1.

The carrier pin 20 rotationally fixedly connects a switching arm 61 to the setting shaft 26 as seen in FIG. 1d. The switching arm 61 is located radially in relation to the setting shaft 26 and has a contact bridge 66 fastened thereon for a conducting connection of a contact segment 35 to one of the switching contacts 37 assigned to one of the positions P-R-N-D/4-3-2-1 of the selector lever 14 and having a scatter range 37*, (indicated by hatching in FIG. 2), in relation to the respective angular setting of the manual selector lever 14.

An end of the setting shaft 26 opposite the setting lever 16 has a flattened end journal 32, onto which a cam disc designated generally by numeral 55 of the mechanical interlock 18 is plugged by way of a corresponding recess 33 (FIG. 1c) so as to be rotationally fixed but axially displaceable.

The setting shaft 26 is fixedly connected to a hub body 34 at a place located between the carrier 20 and the end journal 32. The lower end of a manual selector lever 14 is fastened to the hub body 34 in such a way that the manual selector lever 14 is rotationally fixedly connected to the setting shaft 26.

An end shield 39 is mounted on a pivot bearing part 36 provided on the outer wall of the instrument carrier 31 so as to be pivotable about the axis of rotation 41—41 of the setting shaft 26. The end shield 39 has an extension arm 38 (FIG. 1c) which is supported on an adjustable supporting bearing 44 of the instrument carrier 31. The distance 45 (designated by the horizontal arrow in FIG. 1c) of the supporting bearing 44 which is axially adjustable relative to the instrument carrier 31 and formed essentially by a screw 47 from the axis of rotation 41—41 of the setting shaft 26 is many times greater than the distance (designated by the vertical arrow) 46 of a radial interlock nose 53 on the cam disc 55.

The end shield 39 has a first, slot-shaped screw passage 40 at the free end of its extension arm 38 and a second slot-shaped screw passage 42 at its opposite end, in each case for a screwed attachment 51 to the instrument carrier 31.

The electromagnet 19, to which the signal 30 from the control unit 24 is supplied, is attached to the end shield 39 so that the axis of movement 48—48 of magnet armature 67 of the electromagnet 19 is aligned vertically in the installation position. An interlock lever 22 is mounted pivotably on the end shield 39 by way of a bearing journal 43. One lever arm 56 of the interlock lever 22 is connected to the magnet armature 67 by a pivot joint designated generally by numeral 23 having an additional degree of freedom, and the other lever arm 75 of the lever 22 has an interlock nose 52 which cooperates with the interlock nose 53 on the cam disc 55.

Furthermore, a catch lever designated generally by numeral 78 is mounted on the end shield 39 so as to be pivotable via a bearing journal 79. The pivot axis 85 of the interlock lever 22 and the pivot axis 86 of the catch lever 78 are each aligned parallel to the axis of rotation 41—41 of the setting shaft 26. The one lever arm 80 of the catch lever 78 is of spherical configuration at its free lever end. A section of the spherical lever end 80 is used as a catch 59 to fix the interlock lever 22 in a release position 58 (FIG. 2), in which the interlock noses 52 and 53 are disengaged and the catch 59 is engaged with a corresponding catch part 63 on the lever arm 75 of the interlock lever 22, i.e. the engagement position 94 in FIG. 2).

Figure 2:
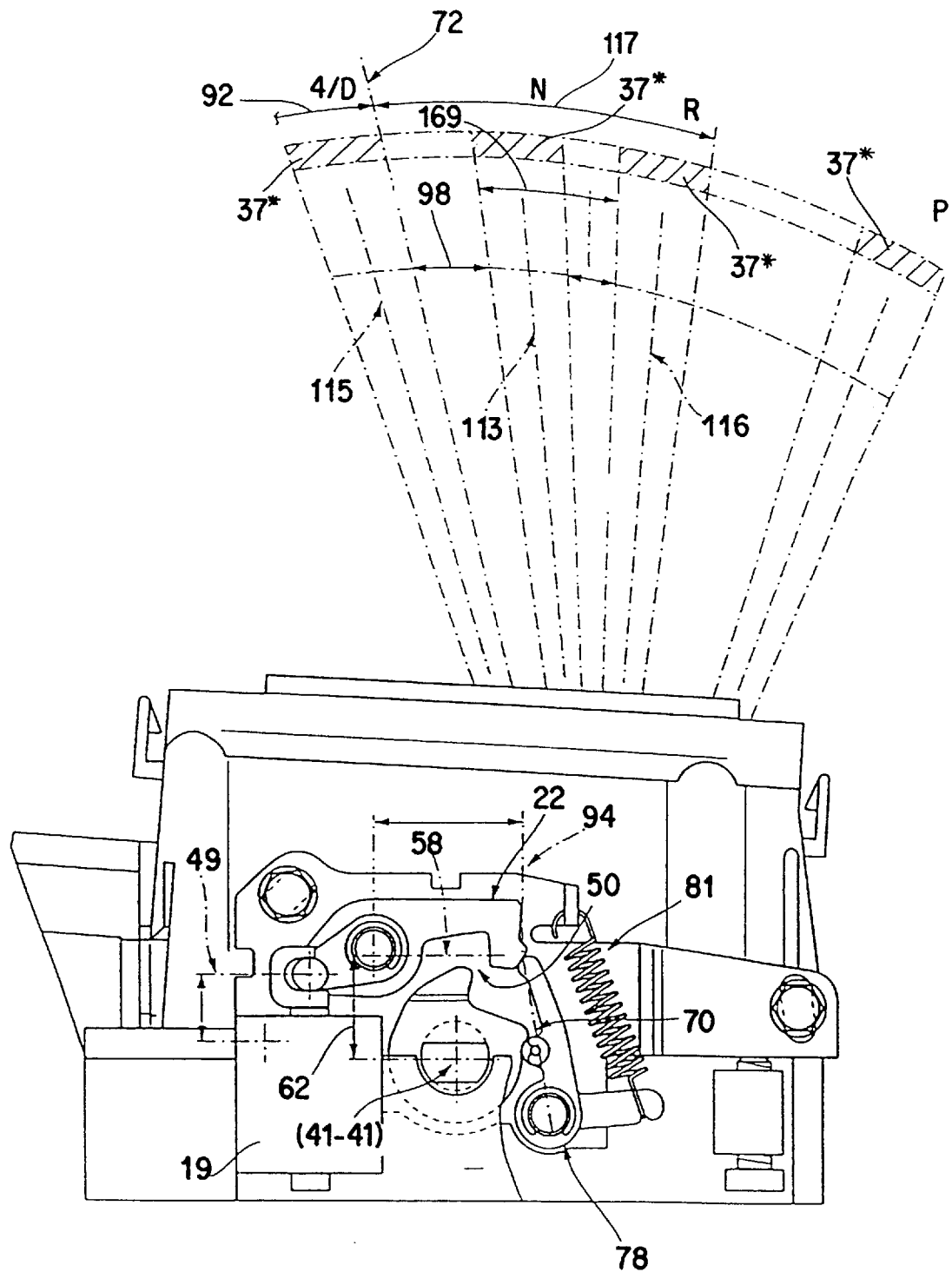
FIG. 2 is a view similar to FIG. 1b but showing the interlock of the instrument carrier, used in the arrangement of FIG. 1, in the unblocked state in which the manual selector lever, during actuation thereof, is just leaving the D-position in the direction of the N-position.
Figure 3:
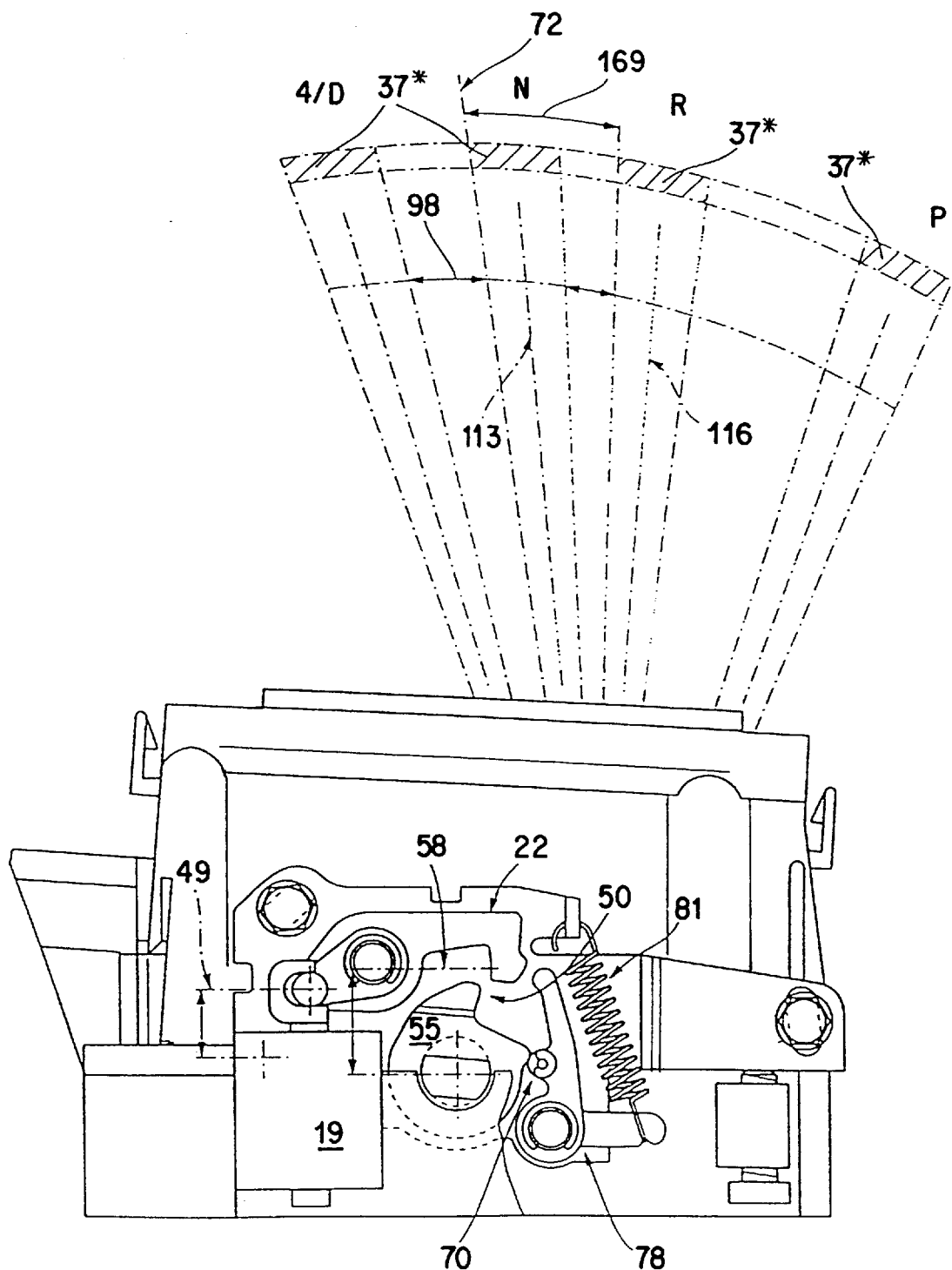
FIG. 3 is a view similar to FIG. 2 but showing the interlock of the instrument carrier, used in the arrangement of FIG. 1, in the unblocked state in which the manual selector lever, during actuation thereof, is just reaching the N-position from the D-position.

The interlock lever 22 is actuated by the retraction spring of the electromagnet 19, when the latter is not excited, into the release position 58 which is thus assigned the rest position 94 of the electromagnet 19 as also seen in FIG. 2. A further section of the spherical lever end of the lever arm 80 of the catch lever 78 is used as a further catch 122 for fixing the interlock lever 22 in an interlock position 121 in which the interlock nose 52 on the interlock lever 22 lies in the path of movement of the interlock nose 53 on the cam disc 55. The catch 122 can be brought into engagement with a corresponding catch part 126 on the lever arm 75, i.e. the engagement position 133 in FIG. 6). The catch part 126 consists of a planar section 137 and an adjoining trough-shaped section 144 as seen in FIG. 1c.

The catches 59, 122 are held in their respective engagement position 94, 133 respectively by a catch spring in the form of a helical tension spring 81 which is anchored at one end on a second lever arm 82 of the catch lever 78 and at its other end on a holder 57 of the end shield 39.

The interlock lever 22 is actuated by the excitation of the electromagnet 19 into its interlock position 121 which thus corresponds to the extended end position 118 of the stroke of the electromagnet 19.

The purpose of the catch 59 is virtually to clamp the interlock lever 22 in the release position 58 (FIGS. 2 and 3) relative to the end shield 39 in order not to allow any rattling noises to occur at all. Because the setting forces of the electromagnet 19 are too weak to push over the catch lever 78 counter to the effect of the helical tension spring 81 when the interlock lever 22 is actuated into its interlock position 121, a positive control in the form of a cam control designated generally by numeral 70 is provided between the setting shaft 26 and the catch 59 in order to produce a free passage between the catch and the interlock lever 22 and thus to be able to move the interlock 18 out of its release position 50 (FIG. 2) into the interlock position 60 in FIG. 4. The cam control consists essentially of a control cam 88 on the cam disc 55 with a plurality of cam sections and a corresponding counter-control cam 89 on the catch 59 in the form of a roller which is mounted rotatably on the catch lever 78 and rollingly contacts the control cam 88.

Figure 7:
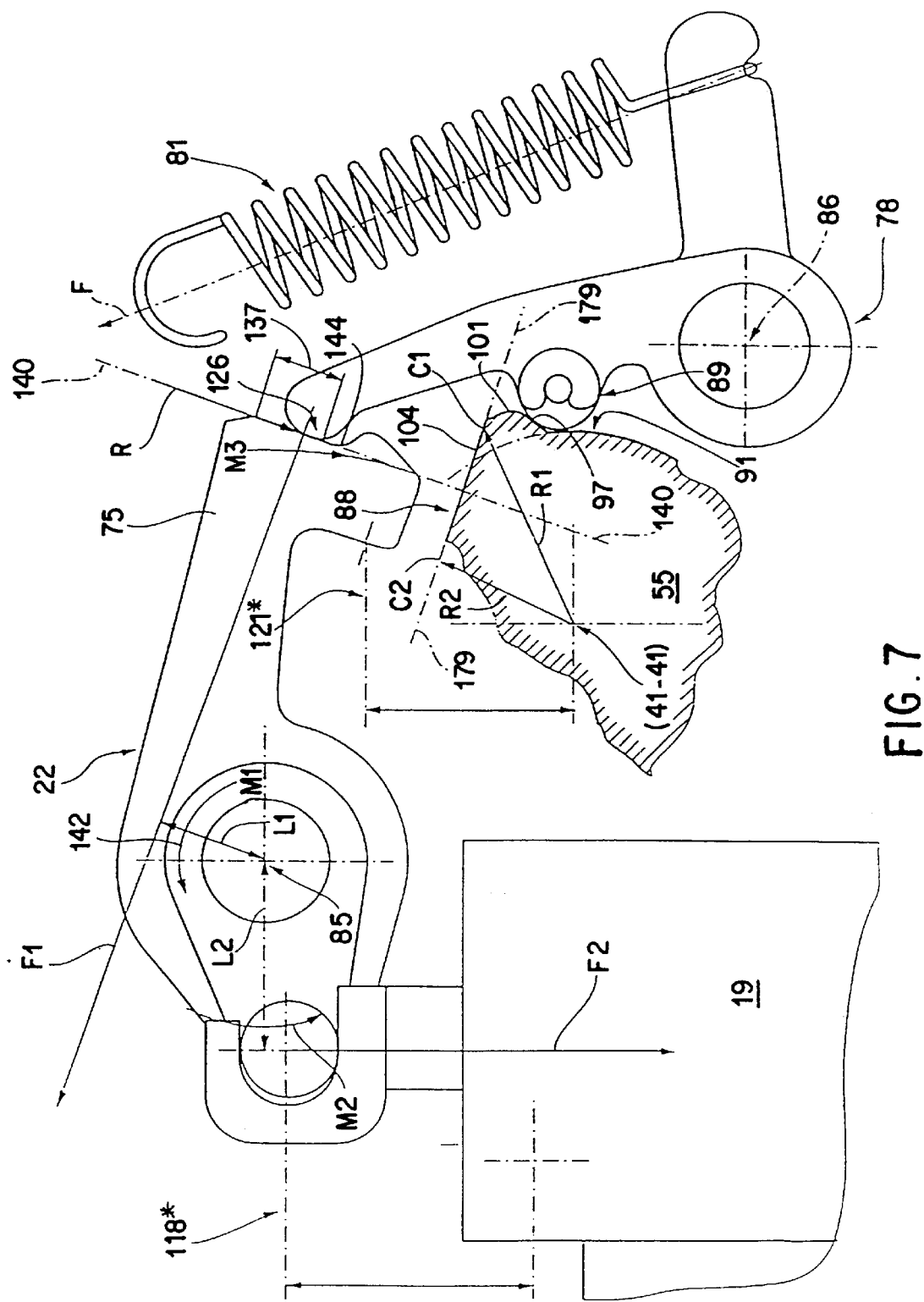
FIG. 7 is an enlarged portion of FIG. 5.
Figure 8:
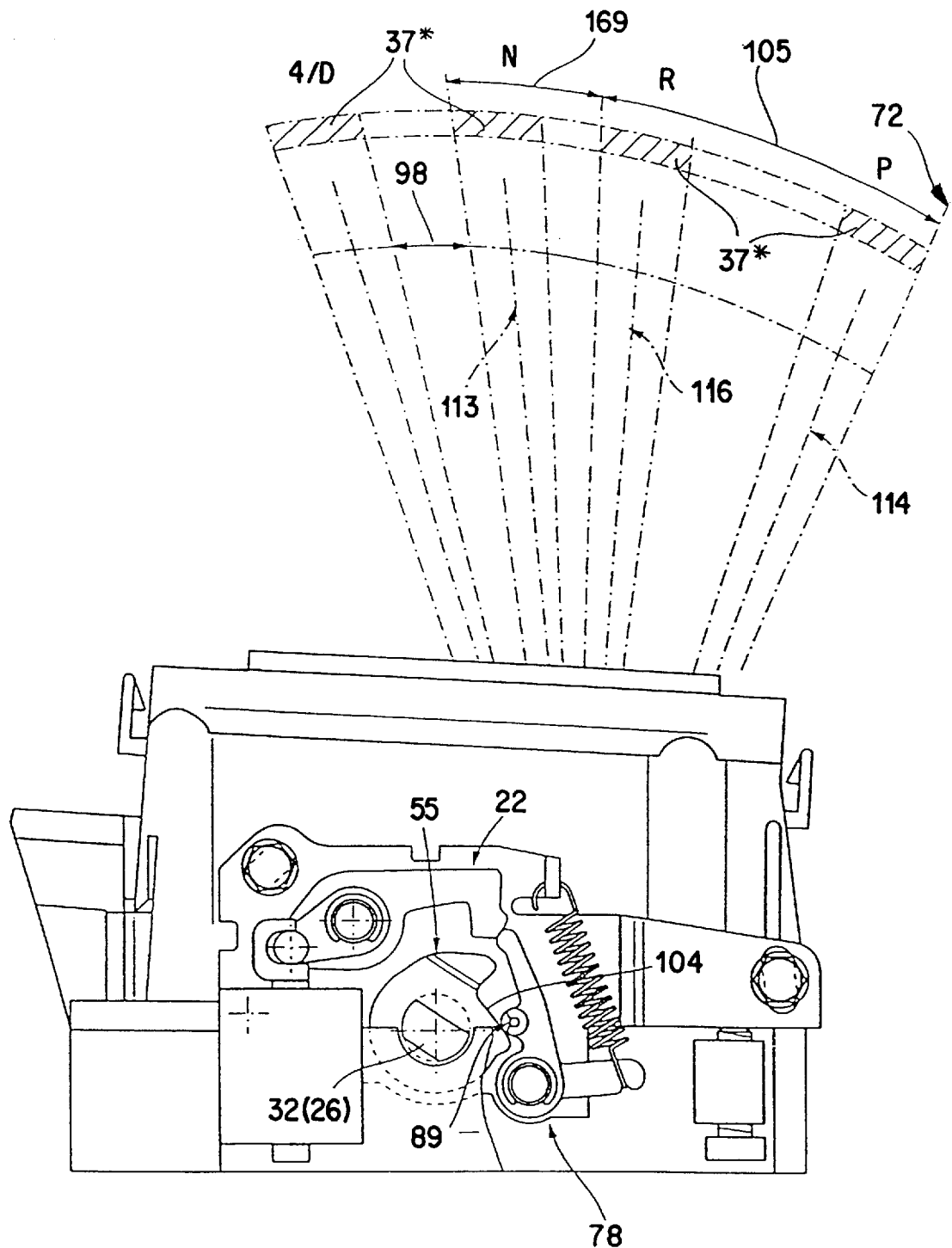

Referring in particular to FIG. 7, the control cam 88 has a cam section 91 which is formed by a surface concentric to the axis of rotation 41—41 of the setting shaft 26 and by way of which the catch lever 78 can be fixed, under the effect of the helical tension spring 81 with the counter-control cam 89 resting thereon, in the engagement position 94 (FIG. 2) in relation to the engagement between the catch 59 and the catch part 63, and in the engagement position 133 (FIG. 6) in relation to the engagement between the catch 122 and the catch part 126.

Figure 4:
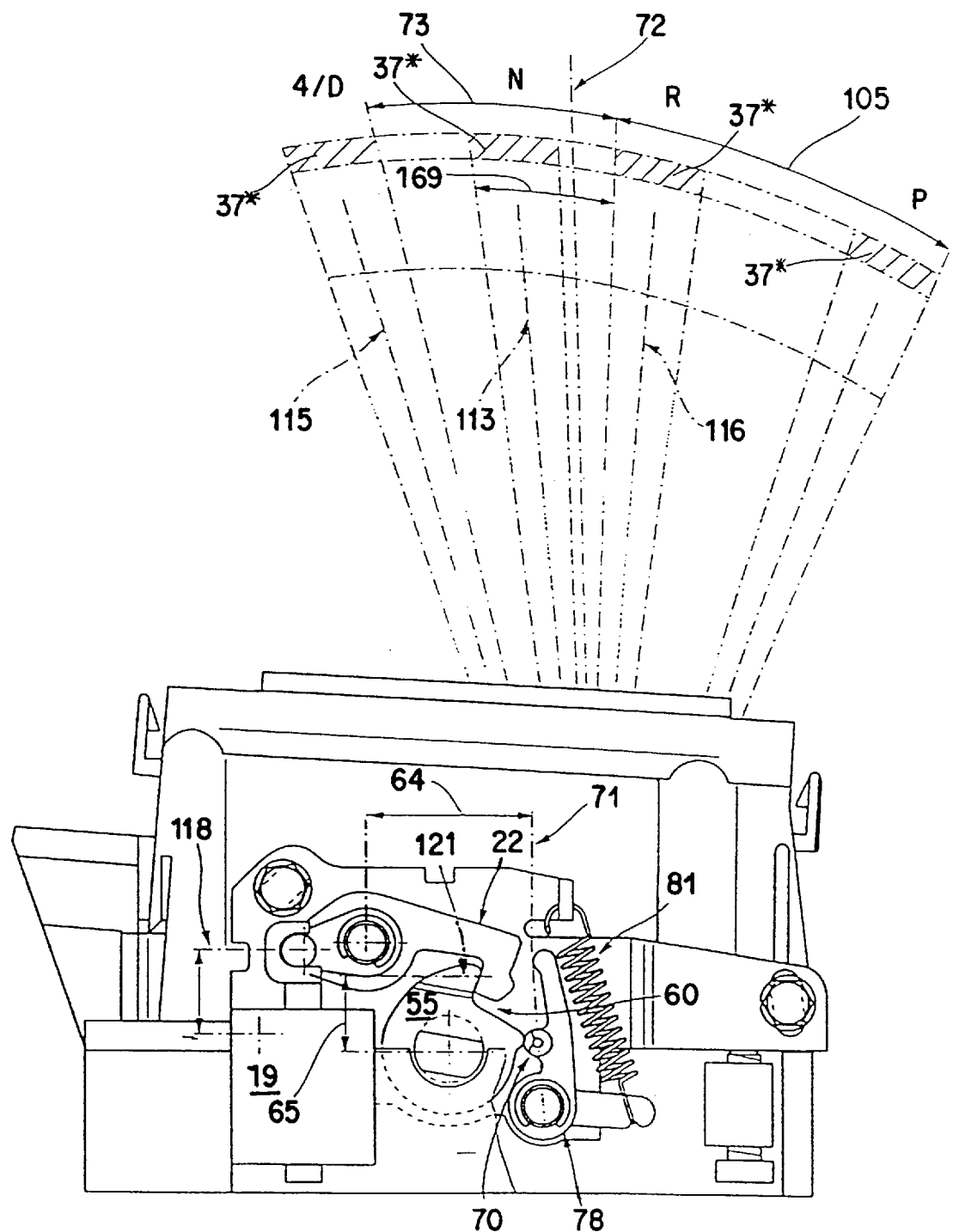
FIG. 4 is a view similar to FIGS. 2 and 3 but showing the interlock of the instrument carrier, used in the arrangement of FIG. 1, in the blocked state in which the manual selector lever, during actuation thereof, is just attempting to leave the N-position in an undesirable or impermissible manner in the direction of the R-position.

The control cam 88 has a cam section 97 which adjoins the cam section 91 in an counterclockwise direction in relation to the axis of rotation 41—41. The cam setting 97 has a rising course relative to the cam section 91 and actuates the catch lever 78 between, on one hand, the engagement position 94 (FIG. 2) or 133 (FIG. 6) and, on the other hand, a free travel position 71 (FIG. 4). The catches 59 and 122 are disengaged relative to the associated catch part in the free travel position 71, regardless of whether the interlock lever 22 is in the release position 58 or in the interlock position 121.

The control cam 88 also has a cam section 101 which adjoins the cam section 97 in a counterclockwise direction in relation to the axis of rotation 41—41 to secure the free travel position 71. That is, the cam section 101 is formed essentially by a cam surface concentric to the axis of rotation 41—41.

Furthermore, the control cam 88 has a cam section 104 which adjoins the cam section 101 in a counterclockwise direction in relation to the axis of rotation 41—41 for actuating the catch lever 78 between the free travel position 71 and the respective engagement position 94, 133 of the catches 59, 122 respectively. The cam section 104 is formed by a cam surface which lies in a plane 179—179 parallel to the axis of rotation 41—41 so that points C1 on this plane located nearer to the cam section 101 have a greater distance R1 from the axis of rotation 41—41 than points C2 which are located further away from the cam section 101 and are thus arranged at a shorter distance R2 from the axis of rotation 41—41. To assure that the engagement positions 94, 133 are reliably reached, the distance R2 is smaller than the radius of the cam section 91. The course 179—179 of the cam section 104 allows the interlock noses 53 and the cam section 104 to lie in a plane of the setting shaft 26 perpendicular to the axis of rotation 41—41, and control cams 88 and interlock noses 53 are thus formed on an integral, relatively thin cam disc 55.

FIG. 7 also shows the particular configuration of the catch part 126 on the lever arm 75 of the interlock lever 22 to cooperate with the catch 122 for the interlock position 121. Accordingly, the catch part 126 has a catch section 137 which is formed by a surface lying in a plane 140—140. Furthermore, the catch part 126 has a trough-shaped receiver 144 adjoining the catch section 137 in the clockwise direction in relation to the pivot axis 85 of the interlock lever 22. The catch part 126 has a geometry adapted to the rounded shape of the catch 122 and is located slightly offset in the direction of the pivot axis 85 relative to the plane 140—140 parallel to the pivot axis 85.

The functioning of the interlock 18 is best understood with reference to the table of FIG. 9. If the driving speed is below the threshold value of 8 km/h, the interlock 18 is in its release position 50 which is illustrated in FIGS. 1c, 2, 3 and 8. Accordingly, the interlock nose 53 on the interlock lever 22, disposed in this state in all positions of the selector lever 14 in its release position 58, has such a sufficiently great distance 62 from the axis of rotation 41—41 of the setting shaft 26 that the interlock nose 53 on the setting shaft 26 is always free relative to the interlock lever 22.

If, in this unblocked state, the momentary position 72 of the selector lever 14 lies within the angular range 92 containing positions 1-2-3-4/D for forward driving, the counter-control cam 89 of the catch lever 78 is engaged with the cam section 91 so that the catch 59 assigned to the release position 58 of the interlock lever 22 is in engagement (the engagement position 94) with the corresponding catch part 63 of the interlock lever 22.

If the momentary position 72 of the selector lever 14 in the non-blocked state of the interlock 18 lies within the angular range 98 located between its D-position (angular setting 115 relative to the axis of rotation 41—41) and its N-position (angular setting 113), the counter-control cam 89 of the catch lever 78 is in engagement with the cam section 97 so that the catch lever 78 is actuated into an intermediate position (FIG. 3) located between the engagement position 94 and the free travel position 71.

If the momentary position 72 of the selector lever 14 in the non-blocked state of the interlock 18 lies within an angular range 169 which adjoins the angular range 98 in the direction of rotation pointing to the angular setting 116 corresponding to the R-position and contains the angular setting 113 corresponding to the N-position, the counter-control cam 89 is in engagement with the cam section 101 so that the catch lever 78 is actuated into its free travel position 71 in which the distance 64 of the catches 59, 122 from the axis of rotation 41—41 of the setting shaft 26 is sufficiently large that the interlock lever 22 is free relative to the catches in all its positions.

If the momentary position 72 of the selector lever 14 lies within an angular range 105 of the setting shaft 26, which angular range adjoins the angular range 169 and contains both the angular setting 116 corresponding to the R-position and the angular setting 114 corresponding to a P-position of the selector lever 14 for setting a parking interlock, the counter-control cam 89 is in engagement with the cam section 104 so that the catch lever 78 is either in the engagement position 94 or in an intermediate position located between the engagement position 94 and the free travel position 71.

The interlock lever 22 is only actuated by the electromagnet 19 into its interlock position 121 (FIGS. 4 and 6), in which its interlock nose 52 has a smaller distance 65 from the axis of rotation 41—41 of the setting shaft 26 than in the release position 58, if first the driving speed had exceeded the threshold value of 8 km/h and afterwards the selector lever 14 had left its angular setting 115 corresponding to the D-position.

When the selector lever 14 has been actuated in the direction of the adjacent forward gear position in the angular range 92 upon leaving the angular setting 115, the excitation of the electromagnet 19 is switched off when this forward gear position is reached and the interlock is thus cancelled again.

When the selector lever 14 is actuated in the direction of its angular setting 113 corresponding to the N-position upon leaving the angular setting 115 (D-position), the excitation of the electromagnet 19 remains intact so that the interlock state 60 occurs in accordance with FIG. 4 when the angular setting 113 is reached. The selector lever 14 is then mechanically blocked by the interlock noses 52, 53 against any, in this situation impermissible or undesirable, further actuation in the direction of its angular setting 116 corresponding to the R-position.

In the last described actuation of the selector lever 14 from the angular setting 115 into the interlock state 60 of FIG. 4, the control cam 88 reached the angular range 169 after passing through the angular range 98. As a result, the catch lever 78 has been actuated via its counter-control cam 89 first by the cam section 97 from its engagement position 133 in relation to the engagement between the catch 121 belonging to the interlock position 121 and the catch part 126 (FIG. 6) into its free travel position 71 and has finally been fixed in the free travel position 71 by the cam section 101 (FIG. 4).

Figure 5:
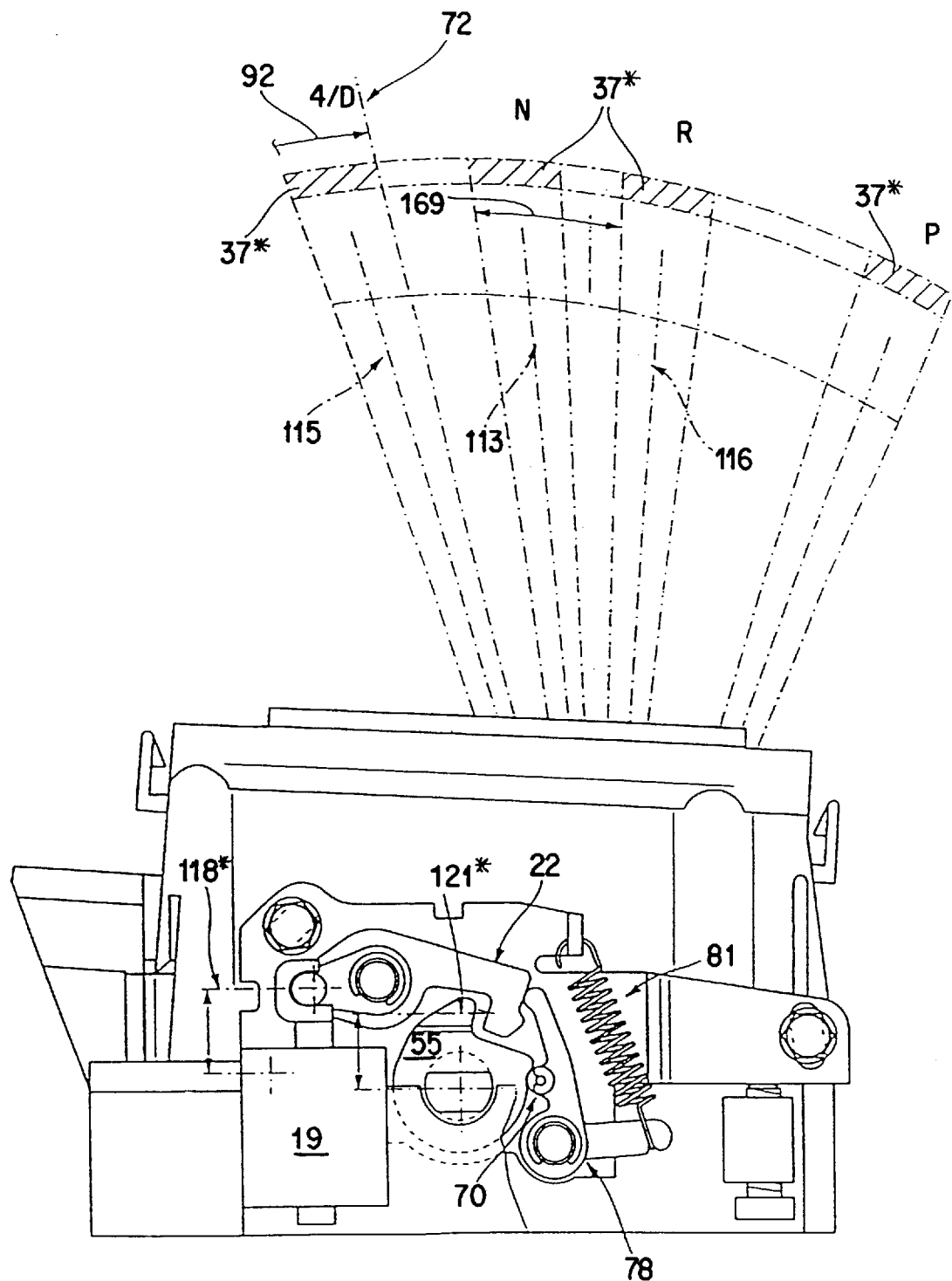
FIG. 5 is a view similar to FIGS. 2 to 4 but showing the interlock of the instrument carrier, used in the arrangement of FIG. 1, in the blocked state in which the manual selector lever, during actuation thereof, is just reaching the D-position from the N-position, and the interlock lever is located in an unstable position.
Figure 6:
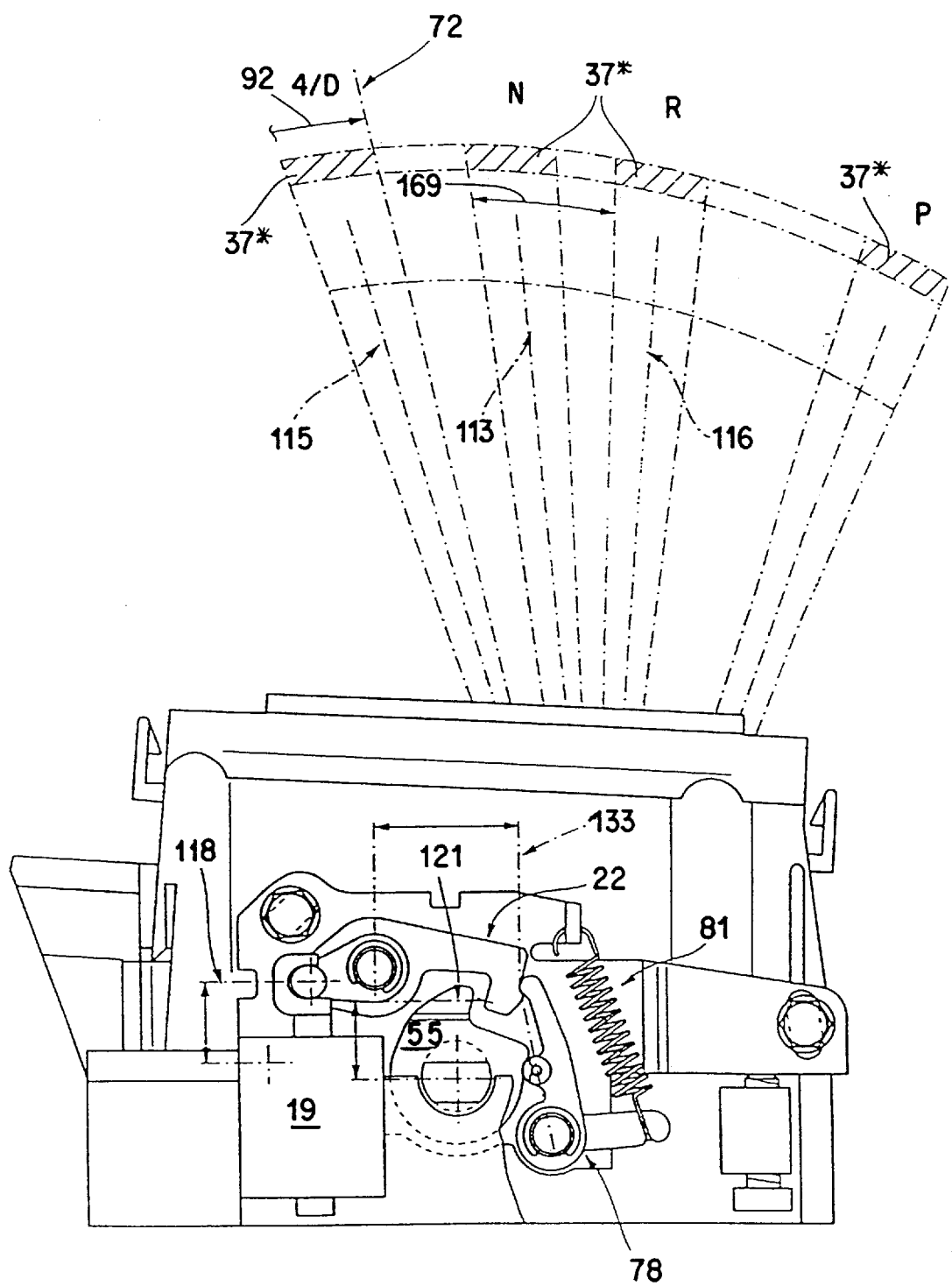
FIG. 6 is a view similar to FIGS. 2 to 5 but showing the interlock of the instrument carrier, used in the arrangement of FIG. 1, in the blocked state in which the manual selector lever, during actuation thereof, is just being actuated again in the direction of the N-position from the position of FIG. 5, i.e. still before finally reaching the D-position.

FIGS. 5 and 7 also illustrate the following mode of functioning of the interlock 18. If an attempt has been made to actuate the selector lever 14 in the direction of the R-position at a driving speed higher than the threshold value, the driver must move the selector lever 14 in the direction of the D-position because this attempted gear-change will have been blocked. With a gear-change in the direction of the N-position, the interlock lever 22 remains free relative to the catch lever 78 and, depending on the driving speed, the electromagnet 19 can remain excited or the excitation can be switched off. During a backward movement of the selector lever 14 in the D-position direction, the counter-control cam 89 runs along the cam section 97. However, the excitation of the electromagnet 19 is only switched off after the D-position has been reached because, prior to that time, no usable signal of the control unit 24 was present which leads to the excitation of the electromagnet 19 being switched off. The catch 122 of the catch lever 78 thus strikes against the catch section 137 of the interlock lever 22 before the latter can return to its release position 58.

If the restoring force of the retraction spring of the electromagnet 19 is too weak to retract the interlock lever 22 counter to the force of the catch lever 78, it is retained in its current position. In order, in this case, to move the interlock lever 22 into a fixed position 121* (FIGS. 5 and 7), the catch section 137 is provided on the interlock lever 22. The catch section 137 lies with its surface, used for the contact with the catch 122, in a plane 140—140 which is defined by two straight lines. One of the lines runs parallel to the pivot axis 85. The other line runs perpendicular the first-mentioned line and in a rotation direction which is inclined relative to the tangent of the contact point between the interlock lever 22 and catch lever 78 and which runs in the opposite direction to the direction of rotation 142 for releasing the interlock lever 22. By way of the course of the plane 140—140 which is inclined relative to the radial plane, a torque $M1=F1\times L1$ occurs on the interlock lever 22 about the pivot axis 85 of the interlock lever 22. F1 is equal to the force of the catch lever 78 occurring on the catch section 137 from the force of the helical tension spring 81, and L1 is equal to the distance of the active line of the force F1 from the pivot axis 85.

In the same direction of rotation 142 of the torque M1, a torque $M2=F2\times L2$ acts on the interlock lever 22. F2 is equal to the spring force of the retraction spring of the electromagnet 19, and L2 is equal to the distance of the active line of the force F2 from the pivot axis 85. The friction force R acting between the interlock lever 22 and the catch lever 78 results in a torque M3 about the pivot axis 85 on the interlock lever 22. Torque M3 counteracts torques M1, M2. In total, an equilibrium state can thus be produced on the interlock lever 22. The equilibrium state is disturbed by jolts when driving over unevenness in the road surface. By way of the course of the plane 140—140 according to the invention for the catch section 137, the interlock lever 22 is here set in the direction of its untensioned release position 58 so that the catch 122 can drop into the trough-shaped receiver 144. Consequently, the interlock lever 22 remains firmly in a second interlock position 121* which differs only slightly from its interlock position 121. Then, after a further actuation of the selector lever 14 from the D-position in the direction of the N-position, the interlock lever 22 is released by the catch lever 78. Depending on the driving speed, the interlock lever 22 is then actuated by the electromagnet 19 either into its release position 58 or into its normal interlock position 121.

Although the invention has been described and illustrated in detail, it is to be clearly understood that the same is by way of illustration and example, and is not to be taken by way of limitation. The spirit and scope of the present invention are to be limited only by the terms of the appended claims.

We claim:

1. A gear-change arrangement for an automatically shifting change speed gearbox in a motor vehicle, comprising a gear change device, a manual selector lever operatively connected in a driver's seat region, with the gear change device selectively actuatable from an N-position in which torque transmission is interrupted in the gearbox to one of a D-position for activating a forward driving gear change program and an R-position for changing to a reverse gear, a mechanical interlock configured to be actuated by an associated electromagnet to prevent unintentional changing into the reverse gear, the mechanical interlock having at least one switch arranged to be actuatable as a function of a setting of the gearbox and operatively controlling the electromagnet arranged to act upon the mechanical interlock by moving into an interlock position via a pivotably arranged interlock lever, a setting shaft non-rotatably connected with the manual selector lever operatively connected with the gear change device via a setting linkage, an interlock nose arranged on the setting shaft to selectively engage an interlock nose of the interlock lever for limiting rotation of the setting shaft, a switching arm configured and arranged for actuating corresponding switching contacts of the at least one switch as a function of the setting and non-rotatably connected with the setting shaft, wherein the setting shaft with the manual selector lever, the interlock nose, the switching arm and the interlock lever are disposed in an instrument carrier arranged in the driver's seat region, with the instrument carrier containing the electromagnet and the corresponding switching contacts of the at least one switch, and the interlock nose of the setting shaft is assigned to an angular setting at the N-position constituting the interlock position, and, the at least one switch being movable into a position to produce a control signal to obtain the interlock position of the electromagnet above a predetermined vehicle forward speed at least prior to the manual selector lever reaching the R-position as the manual selector lever is shifted from the D-position.

2. The arrangement according to claim 1, wherein the instrument carrier has an end shield arranged pivotably in relation to an axis of rotation of the setting shaft, and the electromagnet and a bearing of the interlock lever are arranged on the end shield fixable relative to the instrument carrier.

3. The arrangement according to claim 2, wherein the end shield can be supported on a supporting bearing of the instrument carrier, which supporting bearing has a distance from the axis of rotation of the setting shaft greater than a distance of the interlock nose arranged on the setting shaft from the axis of rotation thereof.

4. The arrangement according to claim 3, wherein the supporting bearing is fastened adjustably relative to the instrument carrier.

5. The arrangement according to claim 4, wherein the supporting bearing is supported by a screw in relation to the instrument carrier.

6. The arrangement according to claim 2, wherein a catch, used for a release position of the interlock lever, is arranged on a lever arm of a catch lever arranged pivotably on the end shield.

7. The arrangement according to claim 6, wherein a helical tension spring is anchored at one end thereof on a second lever arm of the catch lever and is anchored at another end on the end shield.

8. The arrangement according to claim 6, wherein pivot axes of the interlock lever and of the catch lever are parallel to the axis of rotation of the setting shaft.

9. The arrangement according to claim 8, wherein a control cam on the setting shaft comprises a cam control for the catch and is arranged to be brought directly into engagement with a corresponding counter-control cam on the catch.

10. The arrangement according to claim 1, wherein the electromagnet is arranged vertically in relation to an axis of movement of an armature thereof.

11. The arrangement according to claim 1, wherein a release position of the mechanical interlock is assigned a non-excited rest position of the electromagnet.

12. The arrangement according to claim 1, wherein a release position of the interlock lever is secured by a catch configured and arranged to be pushed in a direction opposite to a resilient bias and to be brought into engagement with a corresponding catch part on one of the links in a kinematic chain, interlock lever—magnet armature.

13. The arrangement according to claim 1, wherein the setting shaft is connected rotationally securely with respect to a cam disc having the interlock nose.

14. The arrangement according to claim 1, wherein a cam control is operatively arranged between the setting shaft and a catch for a release position of the interlock lever such that the catch is moved into a free travel position, in which an engagement thereof relative to a corresponding catch part is cancelled, when the momentary angular setting of the setting shaft is within an angular range containing the angular setting corresponding to the N-position and extends up to the angular setting corresponding to the R-position.

15. The arrangement according to claim 14, wherein the catch part, which belongs to the catch used for the release position of the interlock lever, is located on a lever arm of the interlock lever having an interlock nose.

16. The arrangement according to claim 14, wherein a common control cam is arranged on the setting shaft for the cam controls of the catch used for the release position of the interlock lever and of the catch used for the interlock position of the interlock lever.

17. The arrangement according to claim 14, wherein a common catch lever has the catches and is provided for the cam controls of the catch used for the release position of the interlock lever and of the catch used for the interlock position of the interlock lever.

18. The arrangement according to claim 1, wherein a catch is provided for a release position of the interlock lever, and a cam control operatively associated with the catch has a first cam section assigned to an angular range of the setting shaft for forward driving and by way of which the catch is fixable in an engagement position in which the catch is arranged to be brought into engagement with a catch part when the interlock lever is in the release position.

19. The arrangement according to claim 18, wherein the cam control for the catch has a second cam section assigned to a second angular range of the setting shaft located between a first angular setting corresponding to the D-position and a second angular setting corresponding to the N-position, and the catch is configured and arranged to be actuatable by the second cam section between an engagement position and a free travel position.

20. The arrangement according to claim 19, wherein the cam control for the catch has a third cam section assigned to a third angular range which contains the setting corresponding to the N-position and extends up to setting corresponding to the R-position, and the catch is configured and arranged to be fixed by the third cam section in the free travel position.

21. The arrangement according to claim 20, wherein the cam control for the catch has a fourth cam section assigned to a fourth angular range which contains the third angular setting corresponding to the reverse gear and a fourth angular setting corresponding to a P-position of the manual selector lever, and the catch is arranged and configured to be actuatable by the fourth cam section between the free travel position and the engagement position.

22. The arrangement according to claim 21, wherein the interlock nose on the setting shaft and the fourth cam section of the cam control of the catch lie in a common plane of the instrument carrier perpendicular to the axis of rotation of the setting shaft, and the fourth cam section is formed by a surface lying in a plane parallel to the axis of rotation of the setting shaft, points of which planar surface located nearer to the adjoining third cam section have a distance from the axis of rotation greater than a distance of points located further away from the third cam section from the axis of rotation.

23. The arrangement according to claim 22, wherein the interlock nose on the setting shaft and the cam sections of the cam control for the catch are integral.

24. The arrangement according to claim 1, wherein an interlock position of the interlock lever is secured by a catch arranged to be pushed in a direction opposite to a resilient bias and is engageable with a corresponding catch part on a link of a kinematic chain, interlock lever and magnet armature.

25. The arrangement according to claim 24, wherein a cam control is provided between the setting shaft and the catch used for the interlock position so that the catch is arranged to be moved into a free travel position in which engagement thereof relative to a corresponding catch part is cancelled when a momentary angular setting of the setting shaft reaches a first angular setting corresponding to the N-position.

26. The arrangement according to claim 25, wherein a control cam of the cam control for the catch used for the interlock—position is directly engageable with a corresponding counter-control cam on the catch.

27. The arrangement according to claim 25, wherein the cam control for the catch, used for the interlock position, has a cam section assigned to an angular range which is located between the first angular setting corresponding to the N-position and a second angular setting corresponding to the D-position, and the catch is configured and arranged to be actuatable by the cam section between the free travel position and an engagement position in which the catch, used for the interlock position, is engageable with the corresponding catch part, with the interlock lever being disposed in the interlock position.

28. The arrangement according to claim 25, wherein the cam control for the catch, used for the interlock position of the interlock lever, has a cam section assigned to an angular range which has an angular setting corresponding to the N-position and extends up to an angular setting corresponding to the R-position, and the catch is fixable by the cam section in the free travel position.

29. The arrangement according to claim 25, wherein the cam control for the catch, used for the interlock position, has a cam section assigned to an engagement position and adjoins a cam section for actuating the catch between the free travel position and the engagement position in a direction of rotation pointing from an angular setting of the setting shaft corresponding to the N-position to an angular setting corresponding to the R-position, and the catch is fixable in the engagement position by the cam section assigned to the engagement position.

30. The arrangement according to claim 25, wherein the cam control for the catch, used for the interlock position interlock lever, has a cam section assigned to an angular range of the setting shaft, which angular range contains an angular setting corresponding to the R-position and an angular setting corresponding to a P-position of the manual selector lever, and the catch is actuatable by the cam section between the free travel position and the engagement position.

31. The arrangement according to claim 25, wherein the catch part, belonging to the catch used for the interlock position, has a section having a course relative to the pivot axis of the interlock lever such that a torque results from engagement with the associated catch on the interlock lever, an active direction of the torque corresponding to a direction of rotation directed from the interlock position to the release position of the interlock lever.

32. The arrangement according to claim 31, wherein the catch part, belonging to the catch used for the interlock position, has a receiver, adjoining the section for the torque acting in the release direction, for the engagement position of the catch, and the receiver is located offset relative to the section in the direction of rotation, pointing from the release position to the interlock position, relative to the pivot axis of the interlock lever.

33. The arrangement according to claim 25, wherein the interlock nose on the setting shaft and a cam section for actuating the catch used for the interlock position lie in a common plane perpendicular to the axis of rotation of the setting shaft between the free travel position and an engagement position, and the cam section is formed by a surface lying in a plane parallel to the axis of rotation of the setting shaft, points of which planar surface located nearer to the adjoining cam section for fixing the catch in the free travel position have a distance from the axis of rotation greater than points of the planar surface located further away from the cam section for fixing the catch in the free travel position from the axis of rotation.

34. The arrangement according to claim 25, wherein the interlock nose on the setting shaft and cam sections of the cam control for the catch, used for the interlock position of the interlock lever, are integral.

35. The arrangement according to claim 25, wherein the corresponding catch part belonging to the catch used for the interlock position, is located on a lever arm of the interlock lever having the interlock nose.

36. The arrangement according to claim 25, wherein the catch used for the interlock position is arranged on a lever arm of a catch lever arranged pivotably on an end shield associated with the instrument carrier.

37. The arrangement according to claim 36, wherein a helical tension spring is anchored at one end thereof on a second lever arm of the catch lever having the catch used for the interlock position, and is anchored at another end thereof on the end shield.

38. The arrangement according to claim 37, wherein a pivot axis of the catch lever, having the catch used for the interlock position, is parallel to the axis of rotation of the setting shaft.

* * * * *